United States Patent [19]
Ikeda

[11] Patent Number: 6,151,068
[45] Date of Patent: Nov. 21, 2000

[54] METHOD AND APPARATUS FOR INPUTTING AND OUTPUTTING IMAGES WHICH OUTPUTS A NORMAL FRAME UNDER POOR CONDITIONS INCLUDING EXTERNAL VIBRATIONS

[75] Inventor: Ikumasa Ikeda, Hayama-machi, Japan

[73] Assignee: Canon Kabushiki Kaisha, Tokyo, Japan

[21] Appl. No.: 08/444,097

[22] Filed: May 18, 1995

[30] Foreign Application Priority Data

May 20, 1994 [JP] Japan .................................. 6-106648
Apr. 5, 1995 [JP] Japan .................................. 7-080411

[51] Int. Cl.[7] .................................................. H04N 5/232
[52] U.S. Cl. ......................... 348/208; 348/231; 358/471
[58] Field of Search ..................................... 348/207, 208, 348/416, 231, 220, 372; 358/209, 135, 906, 471; H04N 5/232, 5/225

[56] References Cited

U.S. PATENT DOCUMENTS 3,571,505  3/1971  Mounts ................................... 348/416
5,469,210  11/1995  Noguchi et al. ......................... 348/208

FOREIGN PATENT DOCUMENTS 0142973  6/1988  Japan ............................. H04N 5/232
0080175  3/1989  Japan ............................. H04N 5/225
0110931  4/1993  Japan ............................. H04N 5/232

OTHER PUBLICATIONS

Matsui et al., "High Speed Transmission of Sequential Freeze–Pictures by Extracting Charged Areas" IEEE Transactions on Communications vol. COM–29, No. 12, Dec. 1981 pp. 1977–1981. 358–135.

*Primary Examiner*—David E. Harvey
*Attorney, Agent, or Firm*—Morgan & Finnegan, LLP

[57] ABSTRACT

An image input apparatus and method which can display a normal frame even in a poor environment including an external vibration has the following arrangement. An image pickup unit (1, 2, 3) images an object to be photographed and generates image data. A storage unit (4) stores the latest image data generated by the image pickup unit (1, 2, 3). An output unit (7, 5, 8, 6) outputs the latest image data stored in the storage unit (4) if the image data generated by the image pickup unit (1, 2, 3) undergoes a change equal to or larger than a predetermined displacement, and outputs the image data generated by the image pickup unit (1, 2, 3) if the image data does not undergo a change equal to or larger than the predetermined displacement.

15 Claims, 10 Drawing Sheets

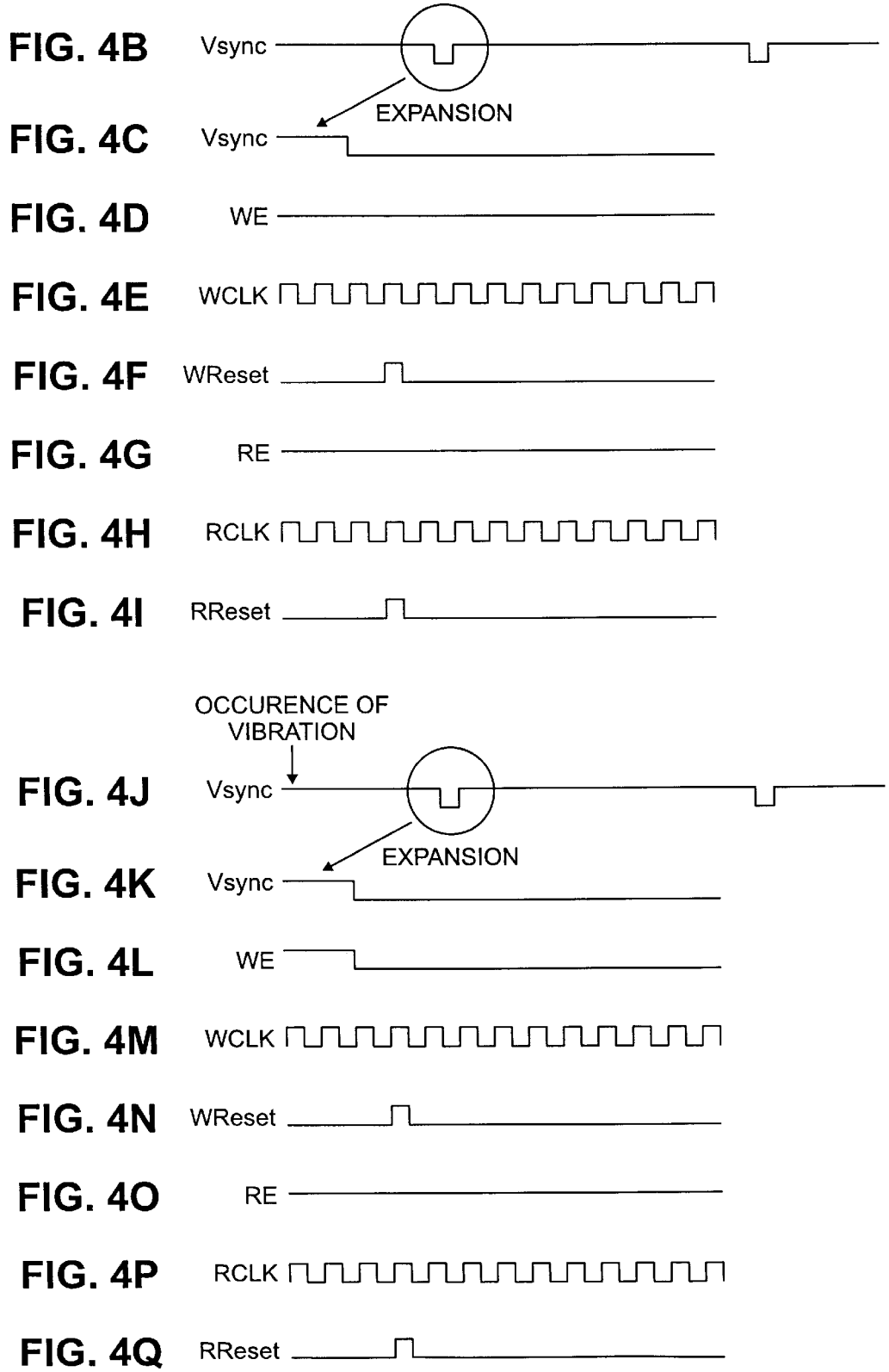

F I G. 8
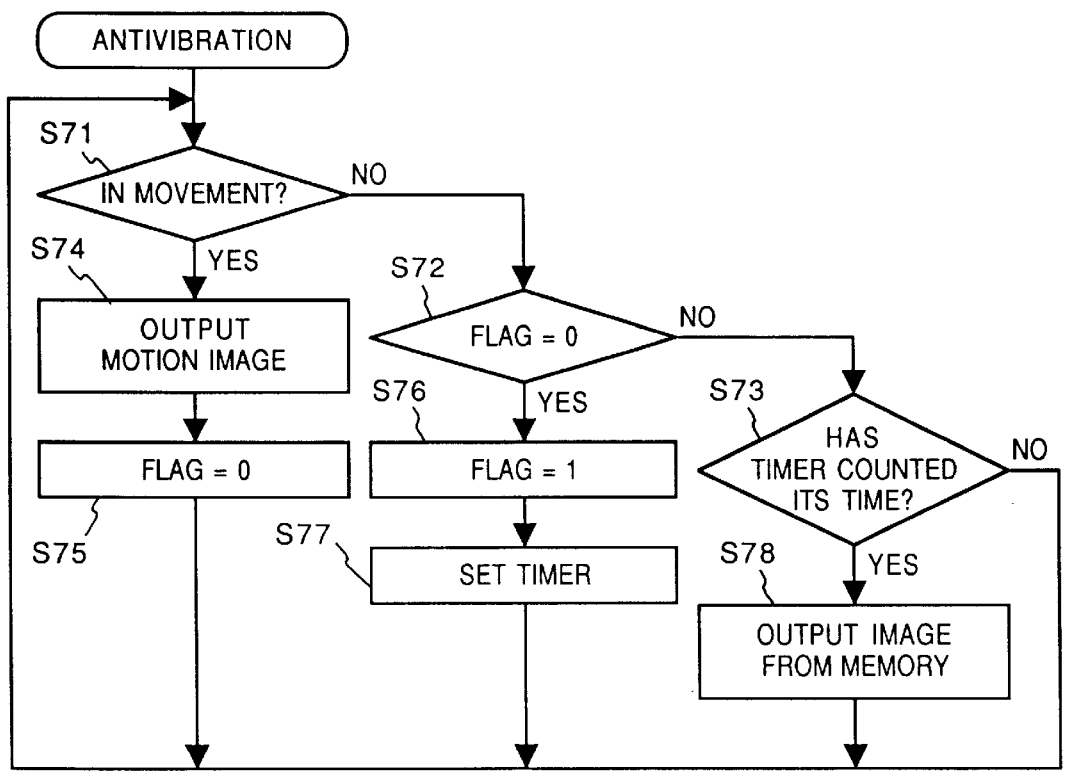

METHOD AND APPARATUS FOR INPUTTING AND OUTPUTTING IMAGES WHICH OUTPUTS A NORMAL FRAME UNDER POOR CONDITIONS INCLUDING EXTERNAL VIBRATIONS

BACKGROUND OF THE INVENTION

1. Field of the Invention

The present invention relates to an image input method and apparatus, more particularly, to a method and apparatus for inputting a character/graphic pattern image of a document including graphs, graphic patterns, and the like.

2. Description of the Related Art

With recent advances in multimedia communication equipment, various input apparatuses have been widely used. Of these apparatuses, video cameras for obtaining images as video signals are especially popular. TV telephone sets and TV conference systems, which constitute the mainstream of the multimedia communication equipment, need to display documents such as materials for a conference to communicate with participants in a remote place. In such a case, character/graphic pattern input cameras (to be referred to as character/graphic pattern cameras hereinafter) are required.

FIG. 9 shows an outer appearance of a character/graphic pattern camera. This camera comprises a camera head portion 11 supported by a support 12, and an original table 13 on which a document or the like is placed. Zooming, focusing, and the like of the camera head portion 11 can be controlled by a computer via, e.g., an RS232C, or a remote control operation of a remote control unit.

According to this conventional apparatus, however, in using this character/graphic pattern camera on a table or the like, when an external vibration occurs, a swinging frame is output. As a result, the frame may become unrecognizable, or a frame with a poor appearance may be displayed.

Assume that an operator bumps against the table on which the character/graphic pattern camera is placed or an original is replaced, and the camera head portion 11 or the original table 13 swings or shakes to vibrate. In this case, an image which swings upon vibration of the camera head portion 11 or the original table 13 is displayed. If, for example, the conventional character/graphic pattern camera placed on a table is used for a TV telephone set or a TV conference system, disturbed image information obtained during the vibration of the camera head portion 11 or the original table 13 is transmitted, resulting in a poor image.

SUMMARY OF THE INVENTION

The present invention has been made in consideration of the above related art, and has as its object to provide an image input method and apparatus which can display a normal frame even in a poor environment including an external vibration.

The above object can be achieved by the following apparatus and method.

An image input method comprises an imaging step of imaging an object to be picked and generating image data, a storing step of storing latest image data generated in the imaging step, and an output step of outputting the latest image data stored in the storing step if the image data generated in the imaging step undergoes a change not less than a predetermined displacement, and outputting the image data generated in the imaging step if the image data does not undergo a change not less than the predetermined displacement.

An image input apparatus comprises image pickup means for imaging an object to be picked up and generating image data, storage means for storing latest image data generated by said image pickup means, and output means for outputting the latest image data generated by said image pickup means if the image data generated by said image pickup means undergoes a change not less than a first displacement, outputting the image data stored in said storage means if the image data undergoes a change not more than the first displacement and not less than a second displacement, and outputting the image data generated by said image pickup means if the image data undergoes a change not more than the second displacement.

An image input method comprises an imaging step of imaging an object to be picked up and generating image data, a storing step of storing latest image data generated in the imaging step, and an output step of outputting the image data generated in the imaging step if the image data generated in the imaging step undergoes a change not less than a predetermined displacement, and outputting the latest image data stored in the storing step if the image data does not undergo a change not less than the predetermined displacement.

An image input apparatus comprises image pickup means for imaging an object to be picked up and generating image data, storage means for storing latest image data generated by said image pickup means, and output means for outputting the latest image data generated by said image pickup means if the image data generated by said image pickup means undergoes a change not less than a first displacement, outputting the image data stored in said storage means if the image data undergoes a change not more than the first displacement and not less than a second displacement, and outputting the latest image data stored in said storage means if the image data undergoes a change not more than the second displacement.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIGS. 4B–4Q are timing charts associated with the frame memory unit;

FIG. 8 is a flow chart showing processing performed by the image input apparatus according to the fourth embodiment of the present invention.

DETAILED DESCRIPTION OF THE PREFERRED EMBODIMENTS

Preferred embodiments of the present invention will be described in detail in accordance with the accompanying drawings.

Embodiments of the present invention will be described below with reference to FIGS. 1 to 3.

Figure 1:
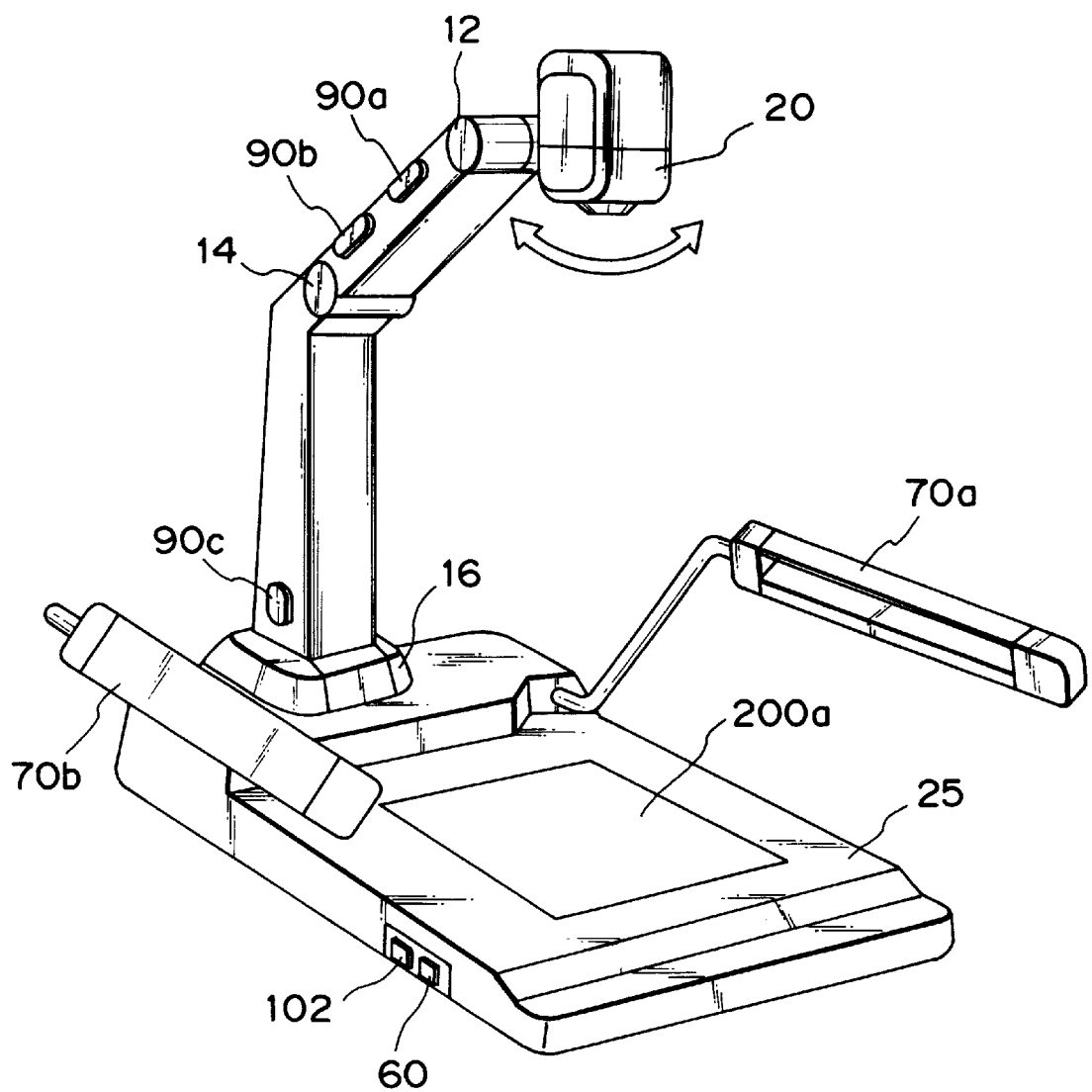
FIG. 1 is a perspective view showing the outer appearance of an image input apparatus according to the first embodiment of the present invention.

FIG. 1 shows the outer appearance of a character/graphic pattern camera of these embodiments.

Referring to FIG. 1, reference numeral 60 denotes a power supply switch for the overall character/graphic pattern camera of these embodiments; 25, an original table on which an original 200a to be imaged by the camera is placed; 20, a character/graphic pattern camera, which can be rotated/moved by a scanning button 90a; 90b, a scanning button for performing moving control of an upper arm supporting the character/graphic pattern camera 20; and 90c, a scanning button for performing moving control of a lower arm supporting the character/graphic pattern camera 20. The imaging position of the character/graphic pattern camera 20 can be arbitrarily controlled by these scanning buttons 90a, 90b, and 90c. Reference numerals 70a and 70b denote a normal lamp and a character/graphic pattern imaging lamp, respectively. When a character/graphic pattern document is to be imaged by the character/graphic pattern camera 20, both the normal lamp 70a and the character/graphic pattern imaging lamp 70b are turned on. These lamps are controlled by a lamp switch 102.

Figure 2:
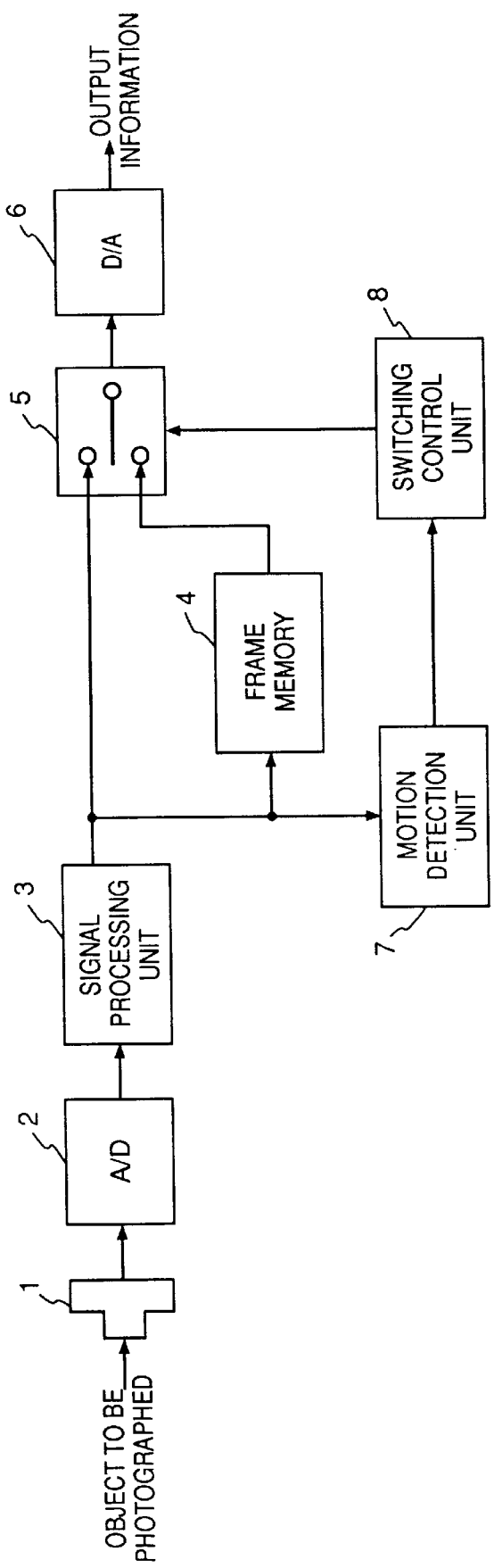
FIG. 2 is a block diagram showing the image input apparatus according to the first embodiment of the present invention.

FIG. 2 is a block diagram showing an image input apparatus according to the first embodiment of the present invention. Referring to FIG. 2, an image pickup unit 1 is constituted by, e.g., an image pickup element such as a CCD as part of the image pickup unit of this embodiment. The image pickup unit 1 images an object to be photographed and outputs the resultant image information of the object to an A/D converter 2. The A/D converter 2 converts the imaging signal, output from the image pickup unit 1, from an analog signal into a digital signal. A signal processing unit 3 separates the digital signal output from the A/D converter 2 into a luminance signal (Y) and a chrominance signal (C), and performs digital signal processing for these luminance and chrominance signals.

A frame memory 4 as a storage means is constituted by a semiconductor memory or the like, and stores a one-frame image signal obtained from the signal processing unit 3. A switching unit 5 as an output information switching means switches between the digital signal obtained from the signal processing unit 3 and the digital signal obtained from the frame memory 4. A D/A converter 6 converts the output digital signal from the switching unit 5 into an analog signal, and outputs the analog signal.

A motion detection unit 7 for performing vibration detection has, for example, one frame memory. A frame stored in the frame memory is divided into several blocks in the horizontal and vertical directions. The motion detection unit 7 compares the image information of each block with the image information of a corresponding block and several adjacent blocks of the next frame to detect the moving direction and distance (i.e., the motion vector) of each block. When the motion detection unit 7 detects a large movement of the image in one direction on the basis of the above motion vector, the unit 7 determines that the object such as a document placed on the original table 25 is replaced. When the motion detection unit 7 detects a small movement of an image, e.g., a periodic small movement of the image, the unit 7 determines that the image is swinging because of vibration of the character/graphic pattern camera 20.

A switching control unit 8 for performing switching control controls the switching unit 5 on the basis of a detection signal obtained from the motion detection unit 7 in such a manner that image information from the image pickup unit 1 and image information from the frame memory 4 are switched to become output information.

In this embodiment, the character/graphic pattern camera 20 for an imaging operation has at least the image pickup unit 1. However, the A/D converter 2, the signal processing unit 3, the frame memory 4, the switching unit 5, the D/A converter 6, the motion detection unit 7, and the switching control unit 8 can be arbitrarily designed to be distributed in the character/graphic pattern camera 20 or a personal computer.

The operation of the image input apparatus of this embodiment will be described next. Assume that the power switch is turned on to start an imaging operation in a state wherein the character/graphic pattern camera 20 and the like stand still and no swing of an image is caused. In this case, the image pickup unit 1 converts the image information of the object into an imaging signal as an electrical signal. The imaging signal as an analog signal is converted into a digital signal by the A/D converter 2. The digital signal is then separated into a luminance signal (Y) and a chrominance signal (C) by the signal processing unit 3 to be subjected to various signal processes. Thereafter, the signals are separated into signals for two systems. The signal for one system is directly input to the switching unit 5, whereas the signal for the other system is input to the switching unit 5 via the frame memory 4.

In this case, since no swing of the image is detected by the motion detection unit 7, the switching unit 5 selects the digital signal from the signal processing unit 3 and outputs it to the D/A converter 6. This digital signal is converted into a video signal as an analog signal by the D/A converter 6. The video signal is then output.

Assume that a swing of an image is caused by vibration of the character/graphic pattern camera 20 or the original table 25 upon replacement of the original. In this case, the motion detection unit 7 detects this swing. The switching control unit 8 switches the switching unit 5 to select the digital signal from the frame memory 4 on the basis of this detection result such that the output information is switched from the image information from the image pickup unit 1 to the image information from the frame memory 4. With this operation, the image information obtained in the initial period of the swing of the image, which has been stored in the frame memory 4, is frozen and output from the D/A converter 6. This output information is then displayed as an image.

When the vibration caused by the swing or shake of the character/graphic pattern camera 20 or the like stops, and the swing of the image stops afterward, the motion detection unit 7 detects this state. The switching unit 5 is controlled by the switching control unit 8 on the basis of this detection result so as to select and output the image information from the image pickup unit 1. As a result, an image of the object such as a document placed on the original table 25 is displayed as an output.

When the object such as a document placed on the original table 25 is replaced, the motion detection unit 7 detects a large movement of the image in one direction, and determines that the image is not swinging. In this case, therefore, the image information stored in the frame memory 4 is neither frozen nor output.

According to the image input apparatus of this embodiment, when the motion detection unit 7 detects that a swing of an image is caused by vibration of the character/graphic pattern camera 20, the original table 25, the table, or the like, the output information is automatically switched to image information from the frame memory 4. That is, the image information obtained in the initial period of the swing of the image becomes the output information. Therefore, no unnecessary image information is output when the image is swinging, and no swinging image is displayed. In addition, when the swing of the image stops, the output information is automatically switched to the image information from the image pickup unit 1. For this reason, an image without any swing can always be displayed. In this embodiment, the character/graphic pattern camera 20 and the original table 25 are integrally formed via a support 22. However, the character/graphic pattern camera 20 and the original table 25 may be separately arranged.

In addition, according to this embodiment, the frame memory 4 is not limited to one in number, and a plurality of memories may be arranged, as needed. With this arrangement, when output information is switched to image information from the frame memory 4, image information having an arbitrary delay time corresponding to the number of frame memories can be obtained as output information.

Furthermore, instead of the frame memory 4 used in this embodiment, a memory which is not connected to the signal processing unit 3 and serves to always store predetermined image information such as title image information may be used. When such a memory is used, the predetermined image information stored in the memory is used as output information upon detection of a vibration.

(Second Embodiment)

Figure 3:
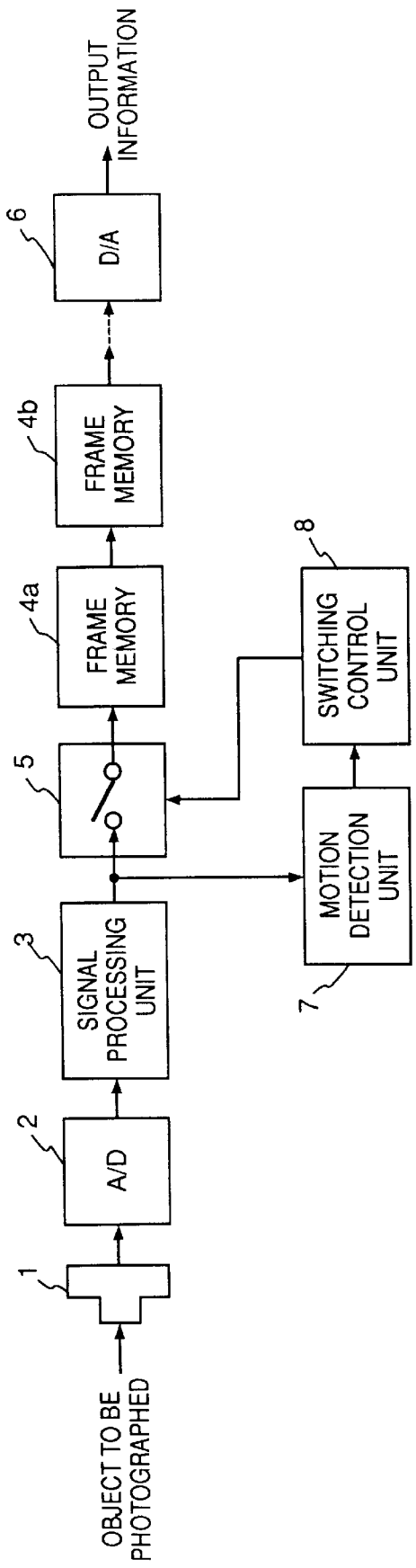
FIG. 3 is a block diagram showing the image input apparatus according to the second embodiment of the present invention.

FIG. 3 is a block diagram showing an image input apparatus according to the second embodiment of the present invention. In this embodiment, a plurality of frame memories 4a, 4b. . . as storage means are arranged between a switching unit 5 and a D/A converter 6 to delay image information so as to control an image to be displayed. More specifically, the switching unit 5 as an output information switching means is turned on/off to switch between image information from an image pickup unit 1 and image information from the frame memories 4a, 4b, . . . , thereby obtaining output information. The same reference numerals in FIG. 3 denote the same parts as in FIG. 2, and a detailed description thereof will be omitted.

The operation of the image input apparatus of this embodiment will be described next. In the embodiment, when a swing of an image takes place upon vibration of a character/graphic pattern camera 20 or the like, a motion detection unit 7 detects the swing of the image in the above-described manner, and supplies the detection result to a switching control unit 8. As a result, the switching control unit 8 turns off the output operation of the switching unit 5 to stop outputting a digital signal from the image pickup unit 1. With this operation, a digital signal from the frame memories 4a, 4b. . . is output to the D/A converter 6, and the image information obtained a few moments before the beginning of the shake of the image, which has been stored in the frame memories 4a, 4b, . . . , is frozen and output from the D/A converter 6. This output information is displayed as an image.

When the vibration of the character/graphic pattern camera 20 or the like stops, and the swing of the image stops afterward, the motion detection unit 7 detects no swing of the image, and supplies the detection result to the switching control unit 8. As a result, the switching control unit 8 turns on the output operation of the switching unit 5 to start outputting the digital signal from the image pickup unit 1. With this operation, the image information from the image pickup unit 1 is output from the D/A converter 6 via the signal processing unit 3, and the image of the object such as a document placed on an original table 25 is displayed again.

According to the image input apparatus of the above embodiment, when the output information is switched to image information from the frame memories 4a, 4b, . . . , image information having an arbitrary delay time corresponding to the number of frame memories can be obtained as output information.

In this embodiment, as is apparent, only one frame memory 4 may be used.

As described above, according to the image input apparatus of the present invention, when a vibration of the camera head portion including at least the image pickup means is detected by the vibration detection means (motion detection unit 7), the output information is switched to image information from the storage means (frame memories 4a, 4b, . . . ). Therefore, image information without any swing, which is obtained before the vibration, can be used as output information.

Therefore, a swinging image obtained while, for example, the character/graphic pattern camera 20 or the original table 25 is vibrating is not displayed, and an object image without any swing can always be displayed.

Figure 4A:
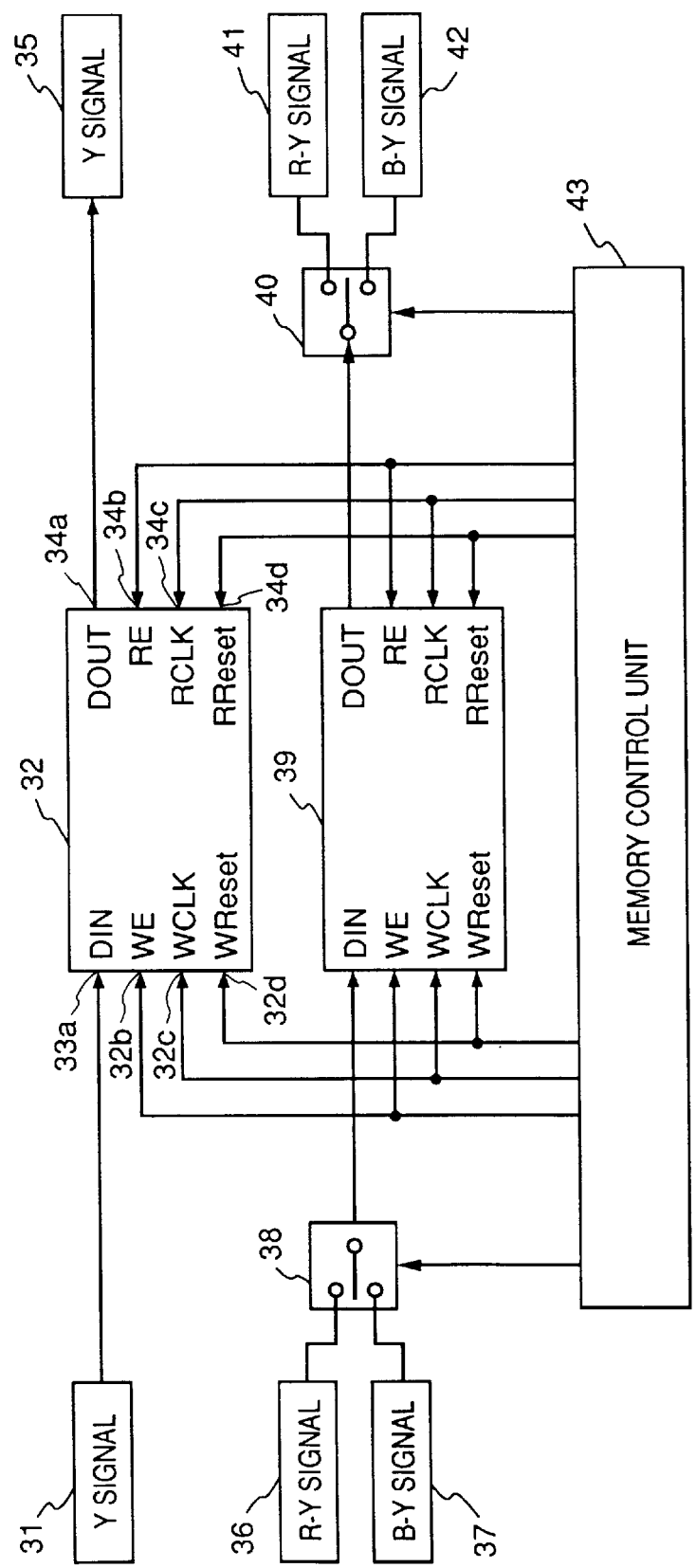
FIG. 4A is a block diagram showing a frame memory unit in detail.

FIG. 4A is a block diagram showing the detailed arrangement of the frame memory 4 in FIG. 2. FIG. 4B is a timing chart. As an example of this memory arrangement, an arrangement constituted by a FIFO memory will be described below.

Reference numeral 32 denotes a FIFO memory corresponding to a one-frame portion of a luminance (Y) signal; 31, a Y signal input terminal; 33a, a DIN (Data Input) terminal for receiving data from the Y signal input terminal 31; 32b, a WE (Write Enable) terminal serving as the write enable terminal of the FIFO memory 32; 32c, a WCLK (Write Clock) terminal; and 32d, a WReset (Write Reset) terminal for setting the current address to the start address.

A memory control unit 43 controls the WE terminal 32b, the WCLK terminal 32c, and the WReset terminal 32d.

Reference numeral 35 denotes a Y signal output terminal; 34a, a DOUT (Data Output) terminal for outputting data to the Y signal output terminal 35; 34b, an RE (Read Enable) terminal serving as the read enable terminal of the FIFO memory 32; 34c, an RCLK (Read Clock) terminal 34c; and 34d, an RReset (Read Reset) terminal 34d for setting the read address to the start address. The RE terminal 34b, the RCLK terminal 34c, and the RReset terminal 34d are controlled by the memory control unit 43.

Reference numeral 39 denotes a FIFO memory corresponding to a one-frame portion of a color difference (C) signal. The arrangement and operation of the memory arrangement of the FIFO memory 39 are the same as those of the luminance (Y) memory 32. Reference numeral 36 denotes an R-Y signal input terminal; 37, a B-Y signal input terminal; and 38, a selector for switching the R-Y signal input terminal 36 and the B-Y signal input terminal 37 to alternately select and output these two color difference signals.

Reference numeral 40 denotes a selector for separating one signal obtained upon alternate selection by the selector 38 into an R-Y signal 41 and a B-Y signal 42, and outputting the signals 41 and 42. Selection timing control of the selectors 38 and 40 is performed by a memory control unit.

FIGS. 4B–4I show the timing of each signal in a normal state wherein no external vibration occurs. In this case, the WE and RE signals are at high level, so that a luminance signal (Y) 31 and color difference signals ((R-Y and B-Y) 36 and 37 are continuously written/read in/from the memories 32 and 39, respectively, and the luminance signal (Y) 31 and the color difference signals (R-Y and B-Y) 36 and 37 are output with a one-frame delay.

Reference symbol Vsync denotes a vertical sync signal. WReset and RRreset are performed in synchronism with the vertical sync signal Vsync to initialize the write and read addresses.

FIGS. 4J–4Q show the timing of each signal in a state wherein an external vibration takes place. In this case, the WE signal is set at low level in synchronism with the next vertical sync signal to inhibit a write operation, and image data stored in the memories 32 and 39 are always output.

In the case of the memory arrangement shown in FIG. 4A, by controlling the RE (Read enable) signal, the switching unit 5 in FIG. 2 can be omitted.

Figure 5:
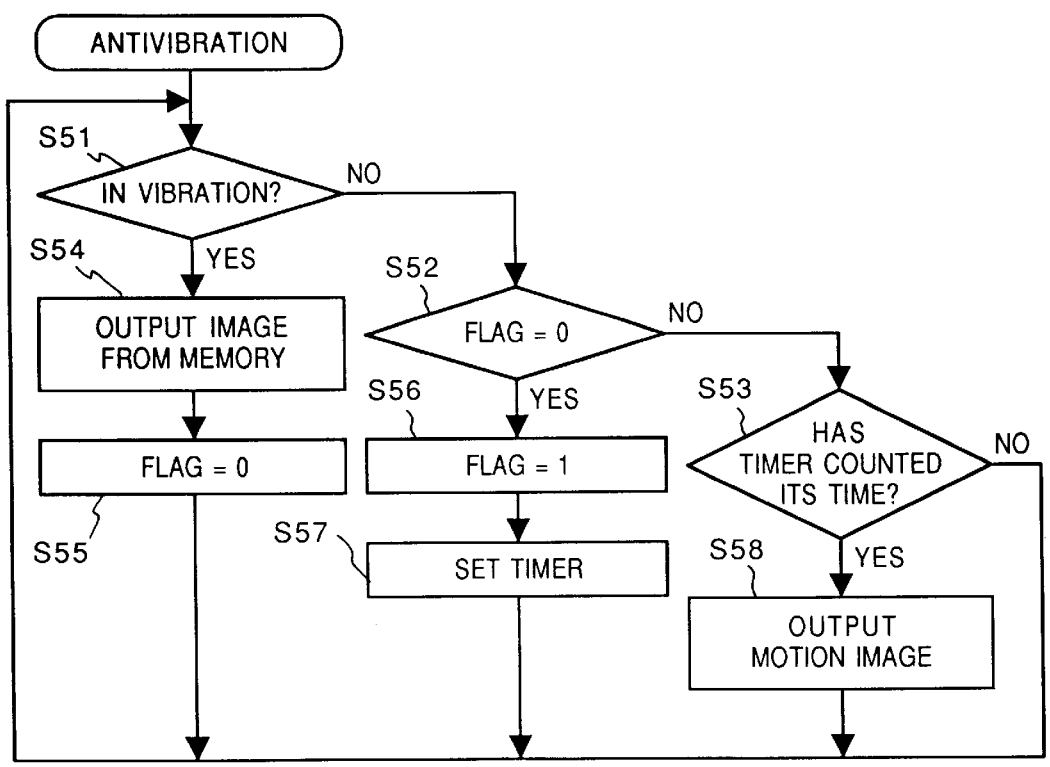
FIG. 5 is a flow chart showing processing performed by the image input apparatus according to the second embodiment of the present invention.

FIG. 5 is a flow chart showing a procedure for antivibration control, which is performed by controlling the switching unit 5 through the motion detection unit 7 and the switching control unit 8. Each step in this procedure will be described below.

In step S51, the motion detection unit 7 checks whether the image input apparatus is vibrating. If a vibration is detected, a vibration detection signal is supplied to the switching control unit, and the flow advances to step S54. If no vibration is detected, the flow advances to step S52.

Note that the motion detection unit 7 always checks whether the image input apparatus is vibrating, and supplies a vibration detection signal to the switching control unit upon detection of a vibration.

In determining whether the image input apparatus is vibrating, the motion detection unit 7 detects the above-mentioned motion vector, and determines a vibration if the moving amount is larger than a predetermined threshold value.

In step S54, the switching control unit 8 receives the vibration detection signal, and controls the switching unit 5 to select an output from the frame memory 4. An internal register FLAG (not shown) is then set to "0", and the flow returns to step S51.

If this FLAG is "0", it indicates the presence of a vibration. If the FLAG is "1", it indicates the absence of a vibration.

If the switching control unit 8 determines in step S52 that the FLAG is "0", i.e., the presence of a vibration, the FLAG is set to "1," and the low advances to step S57. If it is determined that the FLAG is "1", the flow advances to step S53.

In step S57, the switching control unit 8 sets a timer (incorporated in the switching control unit 8) for counting a predetermined time. The flow then returns to step S51.

In step S53, the switching control unit 8 checks whether the timer has counted the predetermined time. If YES in step S53, the switching control unit 8 controls the switching unit 5 to select an output from the signal processing unit 3. If NO in step S53, the flow returns to step S51.

With the above processing, when an external vibration occurs, image data in the frame data is output, and image data from the signal processing unit is output after the vibration stops. Therefore, a stable image can always be displayed.

Note that the wait time set in the above timer is set in consideration of the time required for a vibration to stop.

The timer may be omitted. That is, if a vibration occurs intermittently, and the vibration intervals are long, the timer may be omitted. If, however, the vibration intervals are short, the timer is preferably used to keep outputting an image from the memory during the entire duration of the vibration.

(Third Embodiment)

Figure 6:
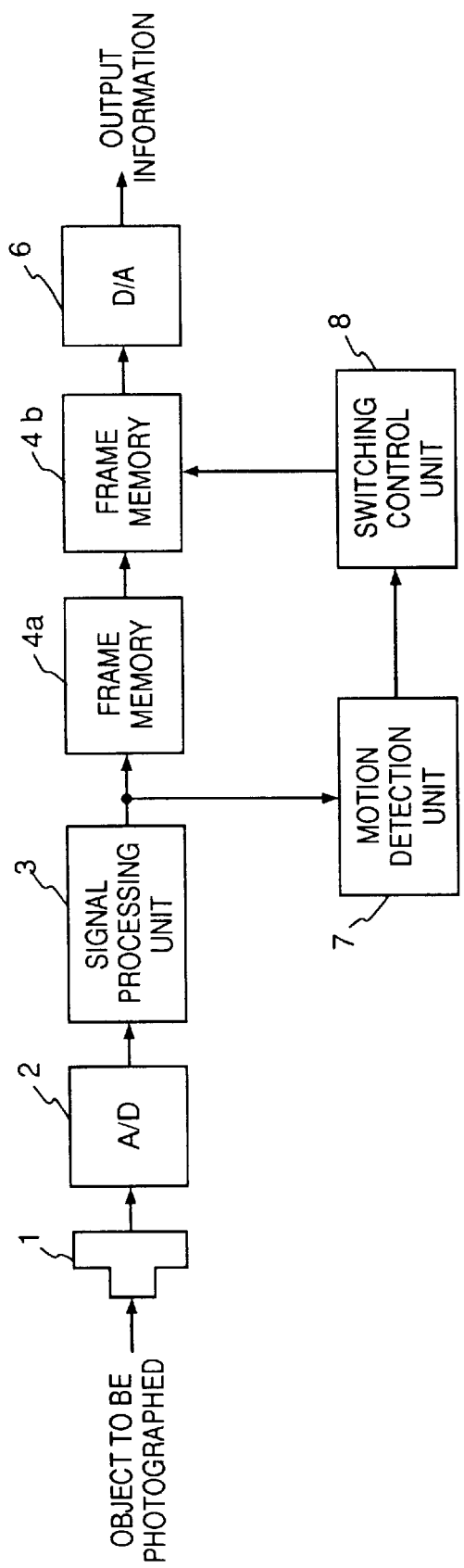
FIG. 6 is a block diagram showing an image input apparatus according to the third embodiment of the present invention.

FIG. 6 is a block diagram showing the arrangement of an image input apparatus according to the third embodiment of the present invention. The constituent elements of this apparatus are similar to those of the apparatus shown in FIG. 2. In this arrangement, however, one or a plurality of frame memories 4 are arranged in front of a D/A converter 6 to provide a delay so as to control an output frame.

In this arrangement, since at least a one-frame delay can be ensured by a frame memory 4a, an image before a vibration can be output more reliably.

In this case, processing performed by a motion detection unit 7 and a switching control unit 8 in FIG. 6 is the same as that indicated by the flow chart of FIG. 5.

(Fourth Embodiment)

Figure 7:
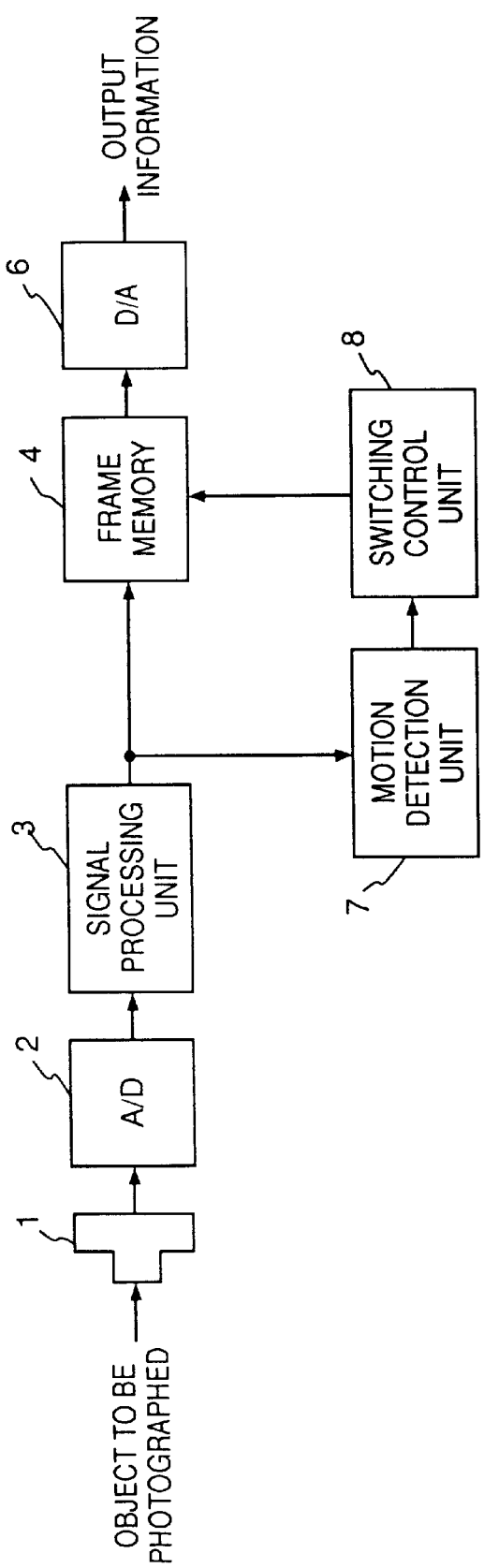
FIG. 7 is a block diagram showing an image input apparatus according to the fourth embodiment of the present invention.
Figure 9:
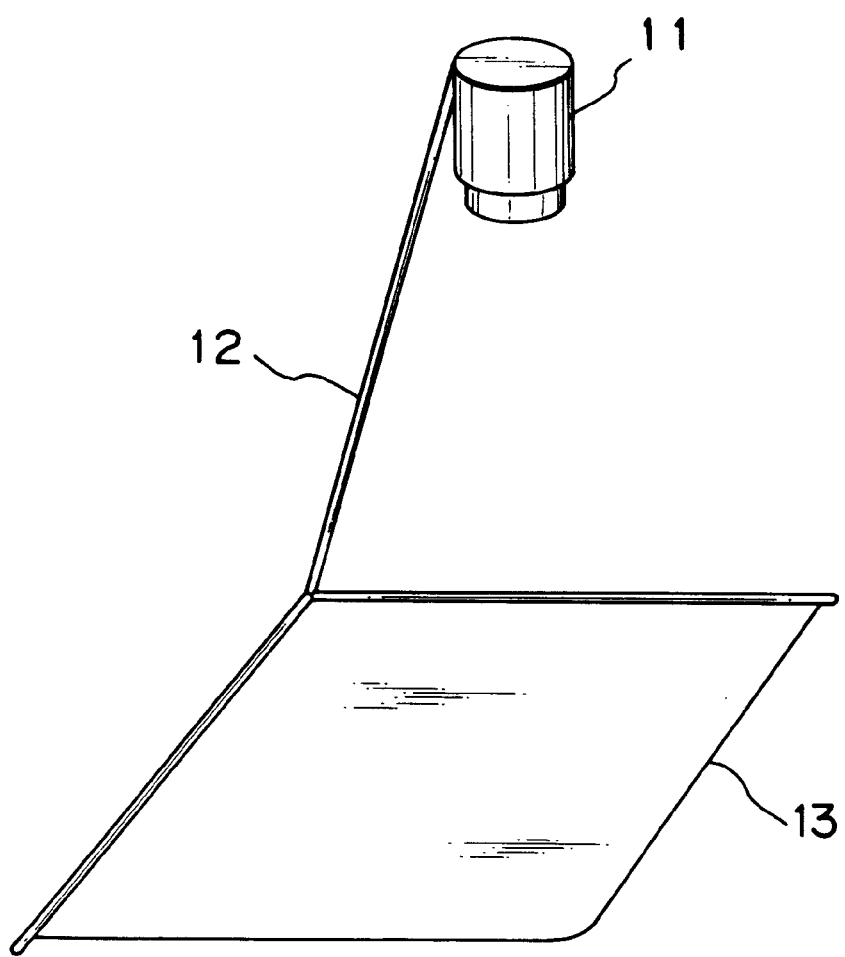
FIG. 9 is a view for explaining a prior art.

FIG. 7 is a block diagram showing the arrangement of an image input apparatus according to the fourth embodiment of the present invention. The constituent elements of this apparatus are similar to those of the apparatus shown in FIG. 6. In this arrangement, however, only one frame memory is used.

The operation of the image input apparatus of this embodiment will be described below with reference to FIG. 1 and FIG. 6.

The operation in a normal state wherein no vibration is present will be described first.

An image pickup unit 1 converts the image information of an object to be photographed, e.g., a document, placed on an original table 25 into an imaging signal as an electrical signal. The following operations are then performed:

(1) When the image moves greatly, it is determined that the character/graphic pattern document is replaced, and a motion image mode is set.

(2) When the image is vibrating at a small amplitude, it is determined that the vibration is caused by an external vibration, and an image from the memory is output.

(3) When the image stand still, the image from the memory is selected.

Switching between a motion image and an image from the memory will be described in more detail.

In a normal state, since a character/graphic pattern document is placed on the original table, a motion detection unit 7 is in a stationary state. For this reason, a switching control unit 8 selects an image from the memory.

Assume that a vibration is produced by a swing of the table or the original table 25. In this case, slight reciprocal movement of the image is detected by the motion detection unit 7. With this operation, it is determined that a vibration has occurred. When this vibration is detected, the image from the memory is selected as well. When the character/graphic pattern document is moved from the original table 25, large movement of the image is detected by the motion detection unit 7. With this operation, it is determined that the character/graphic pattern document is replaced. In this case, the switching control unit 8 selects the motion image mode.

FIG. 8 is a flow chart for image antivibration processing, showing a procedure of antivibration control, which is performed by controlling a frame memory 4 through the motion detection unit 7 and the switching control unit 8 in this embodiment. Each step in this processing will be described below.

In step S71, the motion detection unit 7 checks whether the original is being replaced (is being moved). If YES in step S71, the flow advances to step S74 to instruct the frame memory 4 to output a motion image. In this case, to output the motion image is to continuously perform the following operation: inputting image data from a signal processing unit 3 to the frame memory 4 to delay the data by a predetermined delay time, and outputting the data to the D/A converter to display an image. In this case, the motion detection unit 7 detects a motion vector in the above-described manner, and performs the determination step on the basis of the detected moving amount. If it is determined that the original is not moving, the flow advances to step S72.

In step S75, the switching control unit 8 sets an internal register FLAG (not shown) to "0". The value "0" indicates the presence of a vibration. The flow then returns to step S71.

In step S72, the switching control unit 8 checks the FLAG. If the FLAG is "0", the flow advances to step S76 to set the FLAG to "1" which indicates the absence of a vibration. If the FLAG is "1", the flow advances to step S73.

In step S77, the switching control unit 8 sets a built-in timer to start count a predetermined time, and the flow returns to step S71.

In step S73, the switching control unit 8 checks whether the built-in timer (not shown) has counted the predetermined time. If NO in step S73, the flow returns to step S71. If YES in step S73, the flow advances to step S78 to instruct the frame memory 4 to output the fixed image stored therein. The flow then returns to step step S71.

Note that the above timer serves to count a margin time to ensure the end of a vibration, but is not indispensable for this embodiment and hence may be omitted. Especially, if replacement of a character/graphic pattern document is performed intermittently, and the vibration intervals are long, the timer may be omitted. If, however, the replacement intervals are short, the timer is preferably used to keep outputting a motion image during the whole period of replacement.

Note that the present invention may be applied to both a system constituted by a plurality of units and an apparatus constituted by one unit. In addition, as is apparent, the present invention can be applied to a case wherein the above function can be achieved by supplying programs to a system or an apparatus.

The motion detection unit 7 detects a vibration of the apparatus body or large movement of an object to be photographed on the basis of the motion vector of an input image. As is apparent, such a vibration or movement may be detected by using a physical vibration sensor instead of using an input image.

As has been described above, according to the present invention, the character/graphic pattern camera can display only an image of an object on the original table without displaying a swinging frame resulting from a vibration.

In the first to third embodiments, a motion image is output while the character/graphic pattern camera displays an original image, i.e., an image stand still. When a vibration occurs, the camera outputs the image from the memory. In the first to third embodiments, an image from the memory is output after a vibration occurs. If, however, at least two frame memories are prepared, and an image before detection of a vibration is output from the frame memories, perfect antivibration measures can be taken. In the fourth embodiment, an image from the memory is output while the character/graphic pattern camera displays an original image, i.e., an image stand still. When a vibration occurs, the camera also outputs the image from the memory. When the original is replaced, a motion image is output. In the fourth embodiment, an image from the memory is output in a normal state before a vibration occurs, and the image from the memory dose not change even if a vibration occurs. Therefore, antivibration measures can be taken with only one frame memory. In the fourth embodiment, since one frame memory is sufficient for the apparatus, a simple arrangement can be realized.

As has been described above, according to the present invention, a normal frame can be displayed even in a poor environment including an external vibration.

As many apparently widely different embodiments of the present invention can be made without departing from the spirit and scope thereof, it is to be understood that the invention is not limited to the specific embodiments thereof except as defined in the appended claims.

What is claimed is:

1. An image input apparatus comprising:

image pickup means for imaging an object to generate image data of the object as moving image;

support means for supporting said image pickup means so that said image pickup means images the object;

detecting means for detecting a movement of the object by comparing image data of a first number of frames generated by said image pickup means;

storage means for delaying image data of the object generated by said image pickup means by a time interval corresponding to a second number of frames, wherein the second number being larger than the first number, and storing the delayed image data as a still image; and output means for outputting the moving image data generated by said image pickup means when it is decided that the object is replaced with another one by said detecting means determining that the image data generated by said image pickup means undergoes a change not less than a first displacement, outputting still delayed image data stored in said storage means if said detecting means detects that the image data undergoes a change not more than the first displacement and not less than a second displacement, and outputting the moving image data generated by said image pickup means if said detecting means detects that the image data undergoes a change not more than the second displacement.

2. The apparatus according to claim 1, further comprising image formation means for forming an image corresponding to image data output from said output means.

3. The apparatus according to claim 1, wherein said output means includes means for determining if a norm of a motion vector of the image data generated by said image pickup means is larger than a predetermined threshold value.

4. The apparatus according to claim 1, wherein a change in the image data generated by said image pickup means is caused by a physical vibration of said image input apparatus.

5. The apparatus according to claim 1, wherein a change in the image data generated by said image pickup means is caused by a large movement of the object.

6. An image input method comprising:

an imaging step of imaging an object to generate image data of the object as moving image, said object being mounted on a base;

detecting a movement of the object by comparing image data of a first number of frames generated in said image pickup step:

a storing step of delaying image data of the object generated in the imaging step by a time interval corresponding to a second number of frames, wherein the second number being larger than the first number, and storing the delayed image data into a memory as still image; and an output step of outputting the moving image data generated in the imaging step when it is decided that the object is replaced with another one by determining in said detecting step that the image data generated in the imaging step undergoes a change not less than a predetermined displacement in a predetermined direction, and outputting the still delayed image data stored in the memory if it is decided in said detecting step that the image data generated in the imaging step does not undergo a change not less than the predetermined displacement in the predetermined direction.

7. The method according to claim 6, further comprising an image formation step of forming an image corresponding to image data output in the output step.

8. The method according to claim 6, wherein the output step includes a step of determining if a norm of a motion vector of the image data generated in the imaging step is larger than a predetermined threshold value.

9. The method according to claim 6, wherein a change in the image data generated in the imaging step is caused by a physical vibration of an apparatus implementing the image input method.

10. The method according to claim 6, wherein a change in the image data generated in the imaging step is caused by large movement of the object.

11. An image input apparatus comprising:

image pickup means for imaging an object to generate image data of the object as moving image;

detecting means for detecting a movement of the object by comparing the image data of a first number of frames generated by said image pickup means;

support means for supporting said image pickup means so that said image pickup means images the object;

storage means for delaying image data of the object generated by said image pickup means by a time interval corresponding to a second number of frames wherein the second number being larger than the first number, and storing the delayed image data as a still image; and output means for outputting the moving image data generated by said image pickup means when it is decided that the object is replaced with another one by said detecting means determining that the image data generated by said image pickup means undergoes a change not less than a predetermined displacement in a predetermined direction, and outputting the still delayed image data stored in said storage means if said detecting menas detects that the image data does not undergo a change not less than the predetermined displacement in the predetermined direction and not less than a second displacement.

12. The apparatus according to claim 11, further comprising image formation means for forming an image corresponding to image data output from said output means.

13. The apparatus according to claim 11, wherein said output means includes means for determining if a norm of a motion vector of the image data generated by said image pickup means is larger than a predetermined threshold value.

14. The apparatus according to claim 11, wherein a change in the image data generated by said image pickup means is caused by a physical vibration of said image input apparatus.

15. The apparatus according to claim 11, wherein a change in the image data generated by said image pickup means is caused by a large movement of the object.

* * * * *

UNITED STATES PATENT AND TRADEMARK OFFICE
CERTIFICATE OF CORRECTION

PATENT NO. : 6,151,068
DATED : November 21, 2000
INVENTOR(S) : Ikumasa Ikeda

Page 1 of 1

It is certified that error appears in the above-identified patent and that said Letters Patent is hereby corrected as shown below:

Add after line 73:

(*) Notice: This patent issued on a continued prosecution application filed under 37 CFR 1.53(d), and is subject to the twenty year patent term provisions of 35 U.S.C. 154 (a)(2).

Signed and Sealed this

Eleventh Day of September, 2001

Attest:

*Nicholas P. Godici*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO. : 6,151,068
DATED : November 21, 2000
INVENTOR(S) : Ikumasa Ikeda

It is certified that error appears in the above-identified patent and that said Letters Patent is hereby corrected as shown below:

Title page,
After "[73] Assignee: Canon Kabushiski Kaisha, Tokyo, Japan" please insert
-- [*] Notice: This patent issued on a contiued prosecution application filed under 37 CFR 1.53(d), and is subject to the twenty year patent term provisions of 35 U.S.C. 154(a)(2). --

Signed and Sealed this

Eleventh Day of December, 2001

*Attest:*

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,151,068
DATED : November 21, 2000
INVENTOR(S) : Ikumasa Ikeda

It is certified that error appears in the above-identified patent and that said Letters Patent is hereby corrected as shown below:

Column 7,
Line 18, delete "RRreset" and insert therefor -- RReset --
Line 27, delete "(Read enable)" and insert therefor -- (Read Enable) --

Column 8,
Line 49, delete "stand" and insert therefor -- stands --

Column 12,
Line 23, delete "menas" and insert therefor -- means --

Signed and Sealed this

Twenty-ninth Day of October, 2002

*Attest:*

JAMES E. ROGAN
*Director of the United States Patent and Trademark Office*

*Attesting Officer*